(12) United States Patent
Soegtrop (10) Patent No.: US 9,715,715 B2
(45) Date of Patent: Jul. 25, 2017

(54) EFFICIENT CACHE PRELOADING

(71) Applicant: INTEL MOBILE COMMUNICATIONS GMBH, Neubiberg (DE)

(72) Inventor: Michael Soegtrop, Poing (DE)

(73) Assignee: INTEL DEUTSCHLAND GMBH, Neubiberg (DE)

(*) Notice: Subject to any disclaimer, the term of this patent is extended or adjusted under 35 U.S.C. 154(b) by 210 days.

(21) Appl. No.: 13/792,562

(22) Filed: Mar. 11, 2013

(65) Prior Publication Data

US 2013/0328903 A1    Dec. 12, 2013

Related U.S. Application Data

(60) Provisional application No. 61/656,428, filed on Jun. 6, 2012.

(51) Int. Cl.
  *G09G 5/36* (2006.01)
  *G06T 1/60* (2006.01)
  *G06T 11/40* (2006.01)

(52) U.S. Cl.
  CPC ........... *G06T 1/60* (2013.01); *G06T 11/40* (2013.01)

(58) Field of Classification Search
  None
  See application file for complete search history.

(56) References Cited

U.S. PATENT DOCUMENTS

| | | | |
|---|---|---|---|
| 6,654,022 B1* | 11/2003 | Egan | G06T 1/60 345/501 |
| 6,744,438 B1* | 6/2004 | Baldwin | 345/552 |
| 7,616,209 B1* | 11/2009 | Molnar et al. | 345/545 |
| 2011/0221743 A1* | 9/2011 | Keall et al. | 345/419 |
| 2011/0261061 A1* | 10/2011 | Lees | G06T 1/20 345/501 |
| 2013/0232304 A1* | 9/2013 | Lohman et al. | 711/127 |

FOREIGN PATENT DOCUMENTS

CN      101751278 A      6/2010

OTHER PUBLICATIONS

Office Action received for the corresponding CN Patent Application No. 201310222650.6, dated Sep. 14, 2015, 9 pages of Office Action and 16 pages of English Translation.
Beric et al., "Memory-Centric Video Processing", IEEE Transactions on Circuits and Systems for Video Technology, 2008, 14 pages, vol. 18, No. 4.
German Office Action received for Application No. 10 2013 105 772.1 dated Jan. 7, 2016, 7 pages (Reference Purpose Only).

* cited by examiner

*Primary Examiner* — Barry Drennan
*Assistant Examiner* — Khoa Vu
(74) *Attorney, Agent, or Firm* — Viering, Jentschura & Partner mbB (57) ABSTRACT

Methods, systems, and software are provided that may perform, for example, the following. A preload table may be determined based on a graphics item to be processed. The graphics item may comprise a plurality of graphics lines. The preload table may indicate a pattern of pixel processing and cache line preloading operations for a single one of the graphics lines. For each of the graphics lines of the graphics item, the pixels may be processed and the cache line preloading operations may be performed in accordance with the preload table.

20 Claims, 11 Drawing Sheets

EFFICIENT CACHE PRELOADING

CROSS-REFERENCE TO RELATED APPLICATION

This application claims the benefit of U.S. provisional application No. 61/656,428, filed 6 Jun. 2012, the content of it being hereby incorporated by reference in its entirety for all purposes.

BACKGROUND

Many modern microprocessors offer a method for preloading data to the cache before it is required. In this way memory access latencies can be hidden. However, if cache preloading is not performed in an efficient way, preloading can actually slow down rather than accelerate overall processing. This may be true for both trivial cases (such as a word-to-word memory copy) as well as more complex use cases (such as a bilinear scaling of graphics). A factor that potentially makes preloading even less efficient is that, in some processors such as advanced RISC machine (ARM) processors, preload instructions cannot be made conditional. This can result in preload behavior being rather unpredictable and inefficient.

Even where cache preloading is used, it is typically used in a simplified yet inefficient way. For example, in one approach, a predetermined number of pixels are always preloaded ahead of when the pixels are needed for processing. With such an approach, after loading the data for pixel "i," the data for pixel "i+n+1" is preloaded, where n is the number of pixels that can be processed while preloading one cache line. However, such an approach may not be expected to provide much if any advantage, because data beyond the end of a line of pixels will be preloaded but never used, while data at the beginning of a line is not preloaded. For these and other reasons, cache preload instructions are not widely used in actual practice.

SUMMARY

Various aspects are disclosed herein. For example, some aspects are directed to a method, comprising determining, by a computing device, a preload table based on a graphics item, wherein the graphics item comprises a plurality of graphics lines, and wherein the preload table indicates a pattern of pixel processing and cache line preloading operations for a single one of the graphics lines. The method may further comprise, for each of the graphics lines, processing the pixels and performing the cache line preloading operations according to the preload table, by the computing device.

Further aspects are directed to a computer-readable storage medium storing computer-executable instructions for performing a method comprising determining, by a computing device, a preload table based on a graphics item, wherein the graphics item comprises a plurality of graphics lines, and wherein the preload table indicates a pattern of pixel processing and cache line preloading operations for a single one of the graphics lines. The method may further comprise, for each of the graphics lines, processing the pixels and performing the cache line preloading operations according to the preload table, by the computing device.

Still further aspects are directed to a method, comprising determining, by a computing device, a preload table based on a graphics item, wherein the preload table indicates how many pixels to process before performing a cache line preloading operation. The method may further comprise, for each of a plurality of graphics lines of the graphics item, re-using by the computing device the preload table to process pixels of the graphics line and perform cache preloading.

The preceding presents a simplified summary in order to provide a basic understanding of some aspects of the disclosure. The summary is not an extensive overview of the disclosure. It is neither intended to identify key or critical elements of the disclosure nor to delineate the scope of the disclosure. The summary merely presents some concepts of the disclosure in a simplified form as a prelude to the description below.

BRIEF DESCRIPTION OF THE DRAWINGS

A more complete understanding of the present disclosure and the potential advantages of various aspects described herein may be acquired by referring to the following description in consideration of the accompanying drawings, in which like reference numbers indicate like features, and wherein.

It is noted that one or more of the drawings may not necessarily be drawn to scale.

DETAILED DESCRIPTION

Figure 1:
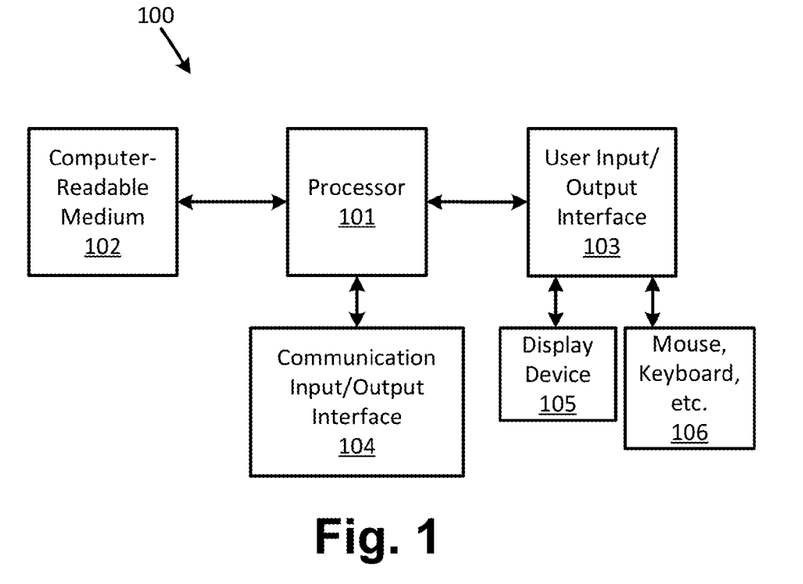
FIG. 1 is a block diagram of an example computing device that may be used to embody any elements described herein and illustrated in the drawings.

FIG. 1 is a block diagram of an example computing device 100 that may be used to any or all of the functions and features described herein. The computing device 100 may include hardware that may operate by, e.g., executing software to perform specific functions. The software, if any, may be stored on a tangible and/or non-transitory computer-readable medium 102 in the form of computer-readable instructions. The computing device 100 may read those computer-readable instructions, and in response perform various steps as defined by those computer-readable instructions. Thus, any functions, steps, calculations, determinations discussed herein may be implemented by the computing device 100, such as by reading and executing computer-readable instructions for performing those functions, and/or by any hardware subsystem (e.g., a processor 101) from which the computing device 100 is composed. Additionally or alternatively, any of the above-mentioned functions may be implemented by the hardware of computing device 100, with or without the execution of software. For example, the computing device 100 may be or include one or more microprocessors, central processing units (CPUs), and/or other types of circuitry configured to perform some or all of the functions attributed to computing device 100. In such embodiments, the processor 101 may be implemented as or otherwise include the one or more microprocessors, CPUs, ASICs, and/or other types of circuitry.

A computing device may include any electronic, electro-optical, and/or mechanical device, or system of multiple physically separate or integrated such devices, that is able to process and manipulate information, such as in the form of data. Non-limiting examples of a computing device include one or more personal computers (e.g., desktop, tablet, or laptop), mainframes, servers, cellular phones (which may be "smart phones"), personal digital assistants, and/or a system of these in any combination or subcombination. In addition, a given computing device may be physically located completely in one location or may be distributed amongst a plurality of locations (i.e., may implement distributive computing). A computing device may be or otherwise include a general-purpose computing device and/or a dedicated computing device configured to perform only certain limited functions.

The computer-readable medium 102 may include not only a single tangible and/or non-transitory medium or single type of such medium, but also a combination of one or more such media and/or types of such media. Examples of embodiments of the computer-readable medium 102 include, but are not limited to, one or more memories (e.g., ROM, RAM and/or FLASH memories), hard drives, optical discs (such as CDs or DVDs), magnetic discs, and magnetic tape drives. The computer-readable medium 102 may be physically part of, or otherwise accessible by, the computing device 100, and may store the above-mentioned computer-readable instructions (e.g., software) and/or computer-readable data (i.e., information that may or may not be executable).

The computing device 100 may also include a user input/output interface 103 for receiving input from a user (e.g., via devices 106 such as a keyboard, mouse, touch screen, an audio microphone, camera, and/or remote control) and/or for providing output to the user (e.g., via a display device 105, an audio speaker or piezoelectric element, an indicator light, a printer, etc.).

The computing device 100 may further include a communication input/output interface 104 for communicating with other devices via wire and/or wirelessly. Such communication with other devices may be direct or it may be indirect via a wired and/or wireless network.

Figure 2:
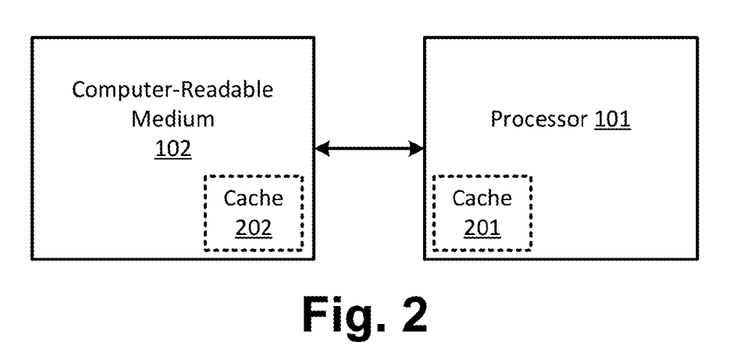
FIG. 2 is a block diagram of an example configuration of a cache of the computing device in accordance with one or more aspects described herein.

As shown in FIG. 2, a cache 202 and/or a cache 201 may be included as part of the computer-readable medium 102 and/or integrated with the processor 101. All references to a cache are intended to include one or both of these caches, as well as any other type of cache configuration.

Figure 3:
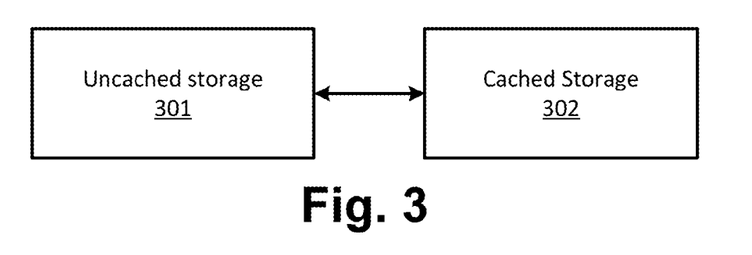
FIG. 3 is a block diagram showing an example transfer between uncached and cached storage in accordance with one or more aspects described herein.

As shown in FIG. 3, data stored in a cache (represented in FIG. 3 as cached storage 302) may be transferred to uncached storage 301 (which may be, e.g., the computer-readable medium 102 other than the cache 202), and vice-versa. Preloading of cache may therefore involve, for example, transfer (e.g., copying or moving) of data from the uncached storage 301 to the cached storage 302. Likewise, the data may subsequently be transferred (e.g., copied or moved) back to the uncached storage 301. Data that may be stored and transferred may be any type of data, including but not limited to graphics data representing a graphics item. For example, the graphics data may represent a bit map and/or a vector set representing the graphics item or may encode the graphics item in any other format. Where the graphics data is a bit map, the bit map may map each pixel value (e.g., color, hue, saturation, and/or other property of the pixel) to each pixel location within a graphics item.

Figure 4:
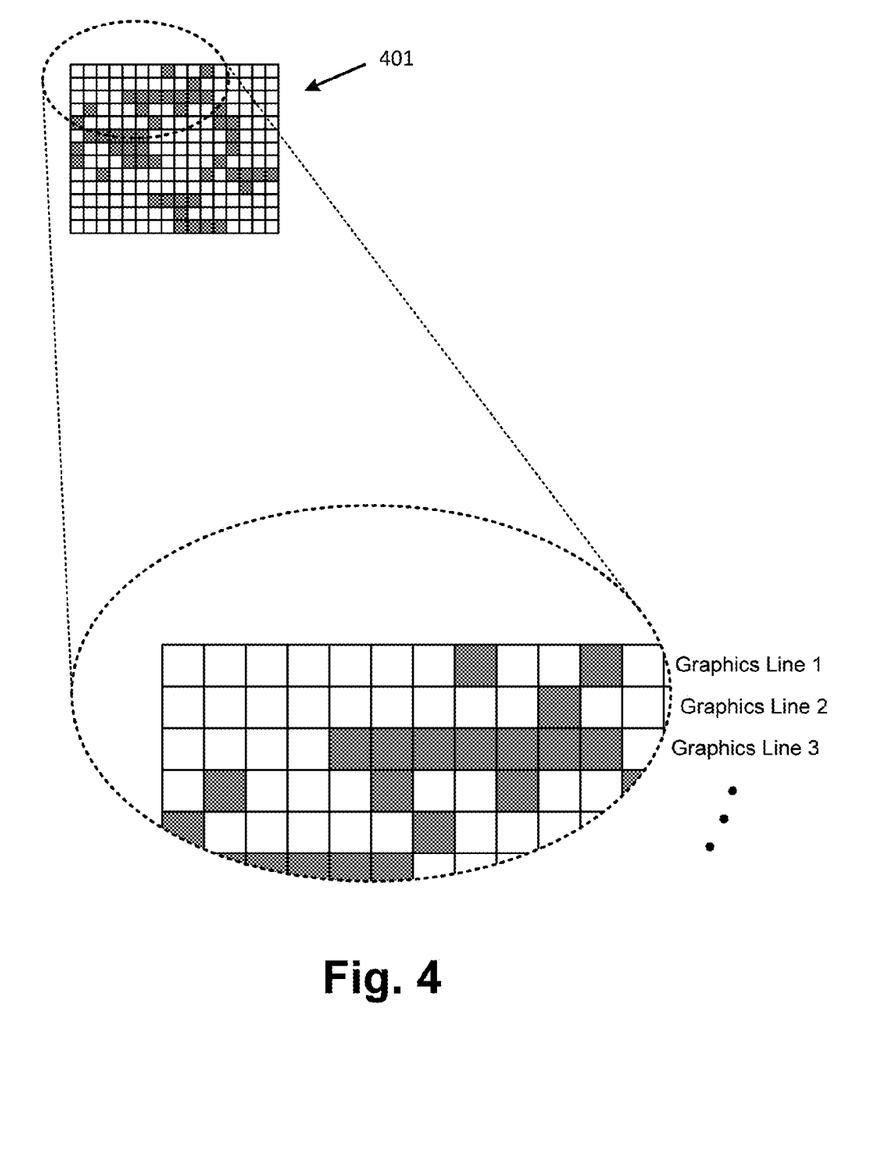
FIG. 4 is a screen shot, with an enlarged portion for illustration, of an example graphics item, or portion thereof, that may be processed in accordance with one or more aspects described herein.

FIG. 4 is a screen shot, with an enlarged portion for illustration, of an example graphics item 401, or portion thereof, that may be processed in accordance with one or more aspects described herein. The graphics item 401 may be displayed by the computing device 100, such as on the display device 105. The graphics item 401 may be, for example, a discrete icon, a portion of a larger graphics item (such as a portion of a displayed photo or graphically rendered design, etc.) The pixels of the graphics item 401 are shown in FIG. 4, and a portion thereof is enlarged for explanation purposes. As can be seen, the graphics item 401 is rendered in a rectangular arrangement of pixels in rows and columns. However, this is merely illustrative, and other renderings of the graphics item 401 may be performed and represented. As shown by way of example in the enlarged portion of FIG. 4, the rows of the graphics item may each be considered to be a separate graphics line (graphics line 1, graphics line 2, graphics line 3, etc.). Alternatively, each column may be considered a graphics line. As will be explained further below, a preload table may be generated and used that may take into account which graphics line of the graphics item 401 is currently being processed and/or preloaded. In general, the preload table may be generated based on one or more of the following: the length of the source graphics lines, the alignment of the source graphics lines (position of the first pixel in a graphics line in the first cache line for that graphics line), the length of the destination lines, a scaling factor (which may be determined by the source and destination line lengths), and/or a preload distance (the value "n," as discussed below, which may be determined to be the number of pixels that can be processed while preloading one cache line, or two cache lines in the case of bilinear interpolation).

As previously discussed, there are various potential problems and complications with using cache preload commands. To potentially overcome this, a table-driven approach may be used for rectangular two-dimensional graphics operations. To implement the table-driven approach, a preload table may be generated that describes cache preloading for a single graphics line of the graphics item 401 (or of any other graphics item being processed). The table may be created once for the operation and then re-used for some or all of the graphics lines in the operation or in later operations. Each entry in the table may contain, for instance, the number of destination pixels to render and the index of the cache line (e.g., relative to the start of the current line) to be used for caching.

Assuming a preload of a cache line is expected to take less time than for processing n pixels, the preload table may be set up using, for example, in accordance with the following rules:

(a) Each cache line is loaded n pixels before the cache line is required (e.g., at least a predetermined number of pixels before a pixel preloaded to the cache line is processed to a destination line). The predetermined number of pixels may be, for instance, n pixels, where n is the number of pixels that can be processed (e.g., as part of an alpha blending operation (including but not limited to Porter-Duff merging), an interpolation operation such as a bilinear interpolation operation, a color format conversion operation, and/or a color processing operation such as color effects or other artistic filters) while preloading one cache line.

(b) The first cache line used for the next graphics line is preloaded upon preloading the last cache line for the current graphics line. This may be performed after preloading the last cache line of the current graphics line and/or before the next graphics line is processed.

(c) If the first cache line preloaded in (b) holds less than a predetermined number of (e.g., n) pixels, the next (second) cache line is also preloaded while processing the previous graphics line.

(d) Preloads that are performed according to (b) are, if possible, shifted to an earlier time such that the distance between successive preloads is at least a predetermined number of pixels (e.g., n pixels).

(e) Only cache lines that are actually needed are preloaded.

(f) If the last preload of a graphics line is for the first cache line of the next graphics line, then the last preload is performed a predetermined number of pixels (e.g., n pixels) before the end of the graphics line. If the last preload of the graphics line is for the second cache line of the next graphics line, then the last preload is performed a smaller predetermined number of pixels before the end of the graphics line. The smaller predetermined number of pixels may be, for instance, n-m pixels before the end of the graphics line, where m is the number of pixels that can be rendered at the beginning of the next graphics line without accessing data of the second cache line for the next graphics line.

The above rules are only an example. Other, simpler rule sets, or other, more complex, rule sets may be used. In other examples, some of the rules may be dropped in favor of a less complex rule set (albeit potentially providing a less efficient graphics operation), such as, but not limited to, by dropping rule (d). Moreover, the rules may or may not be performed or otherwise followed in the order shown above; these rules may be followed in any order desired.

Figure 5:
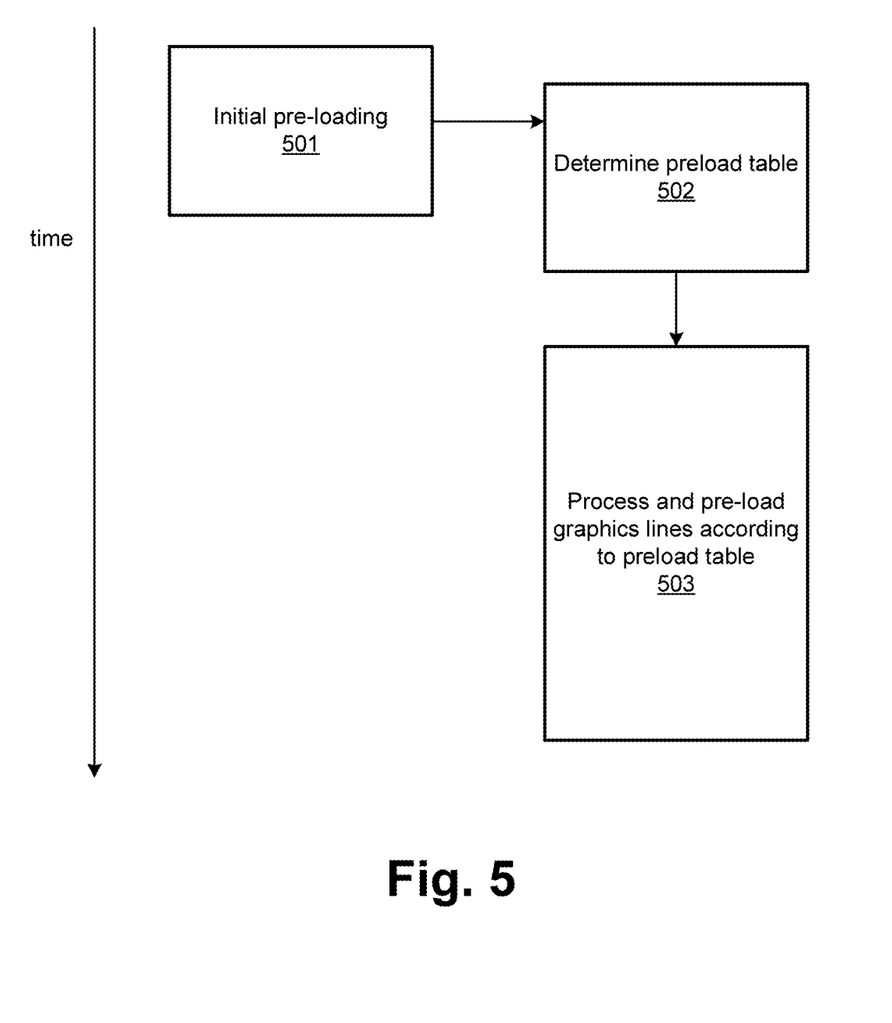
FIG. 5 is a flow chart showing example steps that may be performed in accordance with one or more aspects described herein.

An initial preloading of the cache (e.g., the first one or two cache lines) for the first graphics line may be initiated before generating the preload table, so that the preload time may overlap with the preload table generation time. This is shown by way of example at FIG. 5, in which initial preloading may be initiated at step 501. Once the preloading is initiated (and potentially while the preloading is continuing to be performed), the preload table may be determined at step 502. Once the initial preloading is finished and the preload table is determined, then at step 503 the graphics item may be processed and preloaded according to the preload table. In some cases, such as for bilinear interpolation cases, where two graphics lines are used on input, the cache preload may be performed for both the current graphics line and the next line graphics line. Executing the preload table at step 503 may involve, for example, the following process (shown by way of example using pseudocode):

```
set entry = first entry of table
do
    process number of pixels specified in entry
    if entry is termination entry
    then
        end loop
    endif
    preload source cache line specified in entry
    set entry to next entry in table
enddo
```

The preload table may be stored as data by the computing device 100, such as in the computer-readable medium 102 and/or in the cache. The preload table may include information indicating, for instance, at what point(s) in a graphics line should a cache line be preloaded, and which cache line should be the one to be preloaded; an indication of how many pixels to process before performing a cache line preloading operation; and/or an indication of a pattern of pixel processing and cache line preloading operations for a single one of the graphics lines. The indications may be in absolute or relative terms, and may be formatted in any way desired. for example, if the preload table were to indicate that a single pixel of the graphics item 401 were to be processed, followed by a preloading of cache line #1, followed by a processing of three pixels of the graphics item 401, followed by a preloading of cache line #2, then the preload table might include bytes in the following order: [1 1 3 2]. In this example, the odd bytes would represent the number of pixels to be processed, and the even bytes would identify which cache line is to be preloaded. There are many other ways to represent such information, and this is intended to be only a single non-limiting example. The preload table may be a one-dimensional linear set (e.g., list) of values, a two-dimensional array of values, and/or any other arrangement of values. Regardless of the format, the preload table may be used, for at least some, and perhaps all, of the graphics lines of the graphics item to determine when and how to preload pixels of the graphics item. To execute according to the preload table, the preload table may effectively be considered by the computing device as a simplified executable set of instructions, where the instructions of the preload table may represent, for instance, process X number of pixels, or preload location Y to cache Z.

Figure 8:
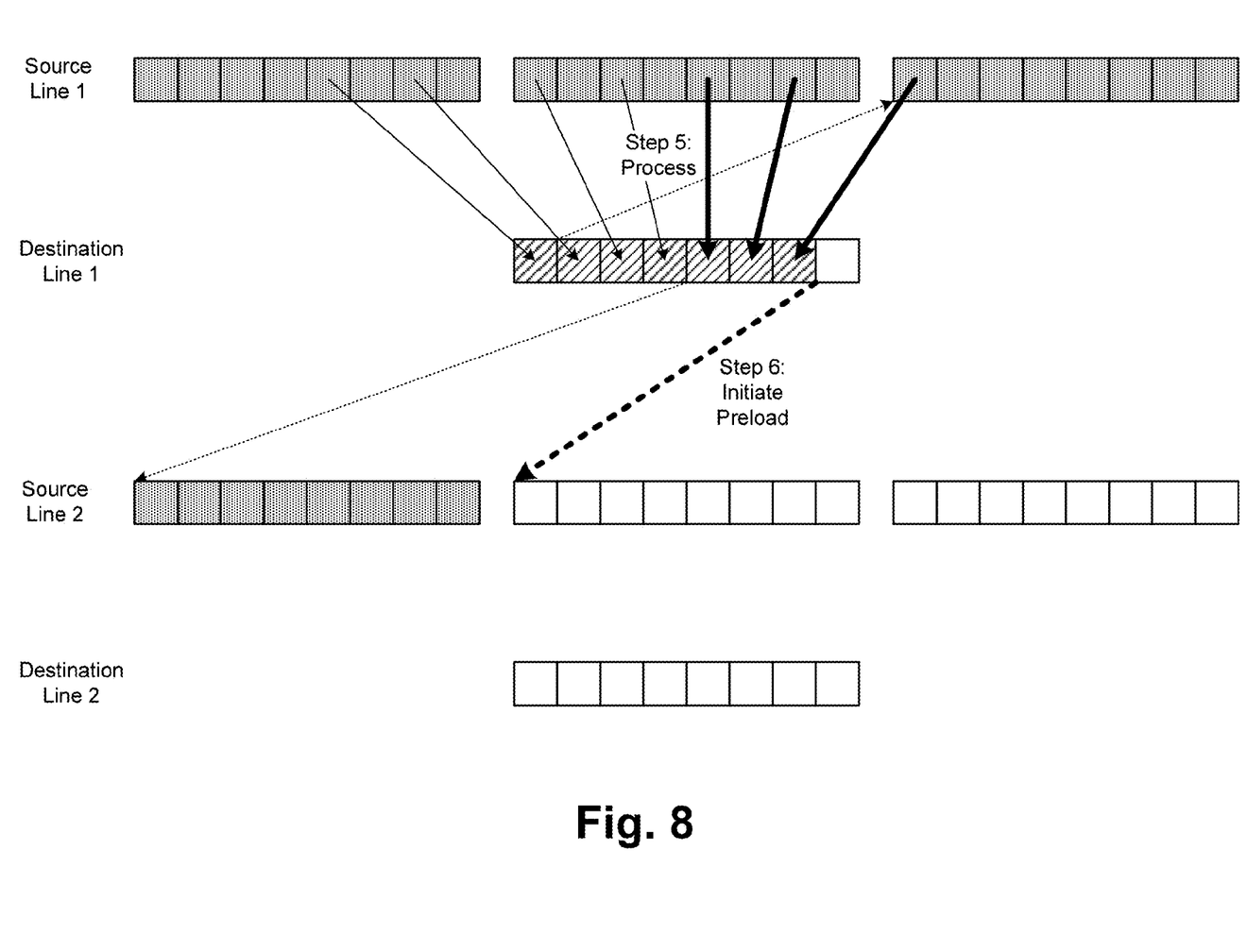
Figure 9:
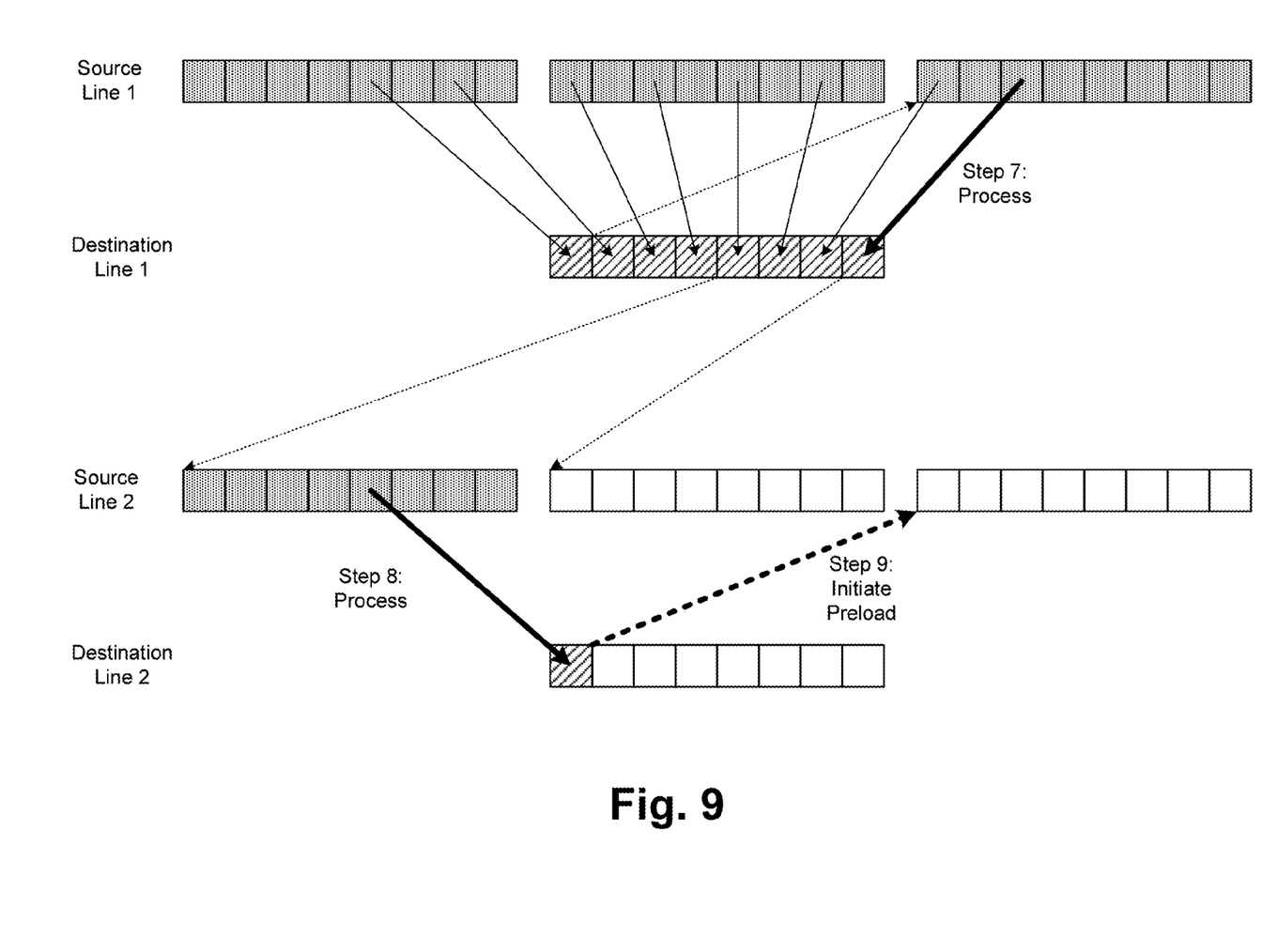
Figure 10:
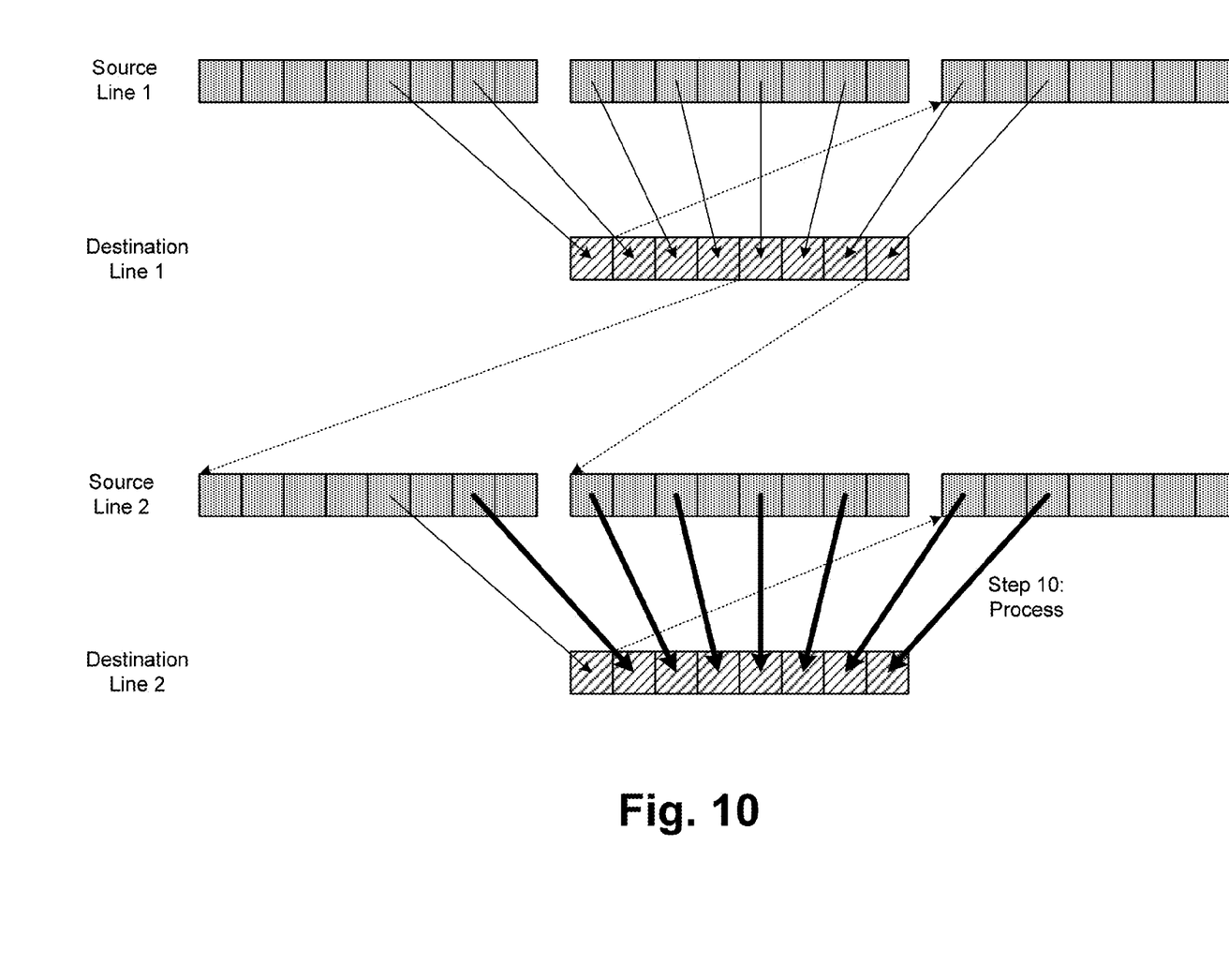

FIGS. 6-10 are block diagrams showing a time sequence example of how a graphics item, such as the graphics item 401, may be preloaded and processed in accordance with a table-driven approach as described herein. Thus, in this example, FIG. 10 is performed after FIG. 9, which is performed after FIG. 8, which is performed after FIG. 7, which is performed after FIG. 6. In each of FIGS. 6-10, two source lines (Source Line 1 and Source Line 2) of a source data storage location are shown relative to two destination lines (Destination Line 1 and Destination Line 2) of a destination data storage location. The operation is thus to process pixel data from the source data storage location to the destination data storage location. Such processing may occur as part of, for instance, graphics item copying, moving, or transforming operations. In some examples, Source Lines 1 and 2 may be the graphics data for a graphics item such as the graphics item 401. In particular, Source Line 1 may represent the first graphics line of the graphics item, and Source Line 2 may represent the second graphics line of the graphics item. There may, of course, be further source lines (e.g., Source Line 3, Source Line 4, etc.). However, only two source lines are shown herein to allow for easier explanation. Likewise, while only two destination lines (Destination Line 1 and Destination Line 2) are shown in FIGS. 6-10, there may be further destination lines (e.g., Destination Line 3, Destination Line 4, etc.). Again, only two destination lines are shown herein to allow for easier explanation. It may also be that there are additional source and/or destination lines between Source Lines 1 and 2 and/or between Destination Lines 1 and 2. In such a case, Source Line 2 may be considered the final source line of the graphics item, and Destination Line 2 may likewise be considered the final destination line. In other examples, the source and destination lines may indeed only include two lines, depending upon the graphics item.

In FIGS. 6-10, each smaller box represents one pixel. In this example, for explanatory purposes only, the pixels are shown grouped in sets of eight pixels, which may be the size of each cache line. In other embodiments, each cache line may hold a fewer or greater number of pixels; eight-pixel length cache lines are merely part of an example. Also, while each of the source and destination lines are shown containing three sets of eight pixels (24 pixels), this is merely an example. The source and destination lines may be of any pixel length. Where a cache is referred to in connection with FIGS. 6-10, the cache may be any cache, such as but not limited to the cache 201 and/or the cache 202, and may be generally referred to as the cached storage 302. Moreover, the source and/or destination lines may be part of, for example, the uncached storage 301, although the source lines and/or the destination lines may also be at least partially stored in the cached storage 302.

Figure 6:
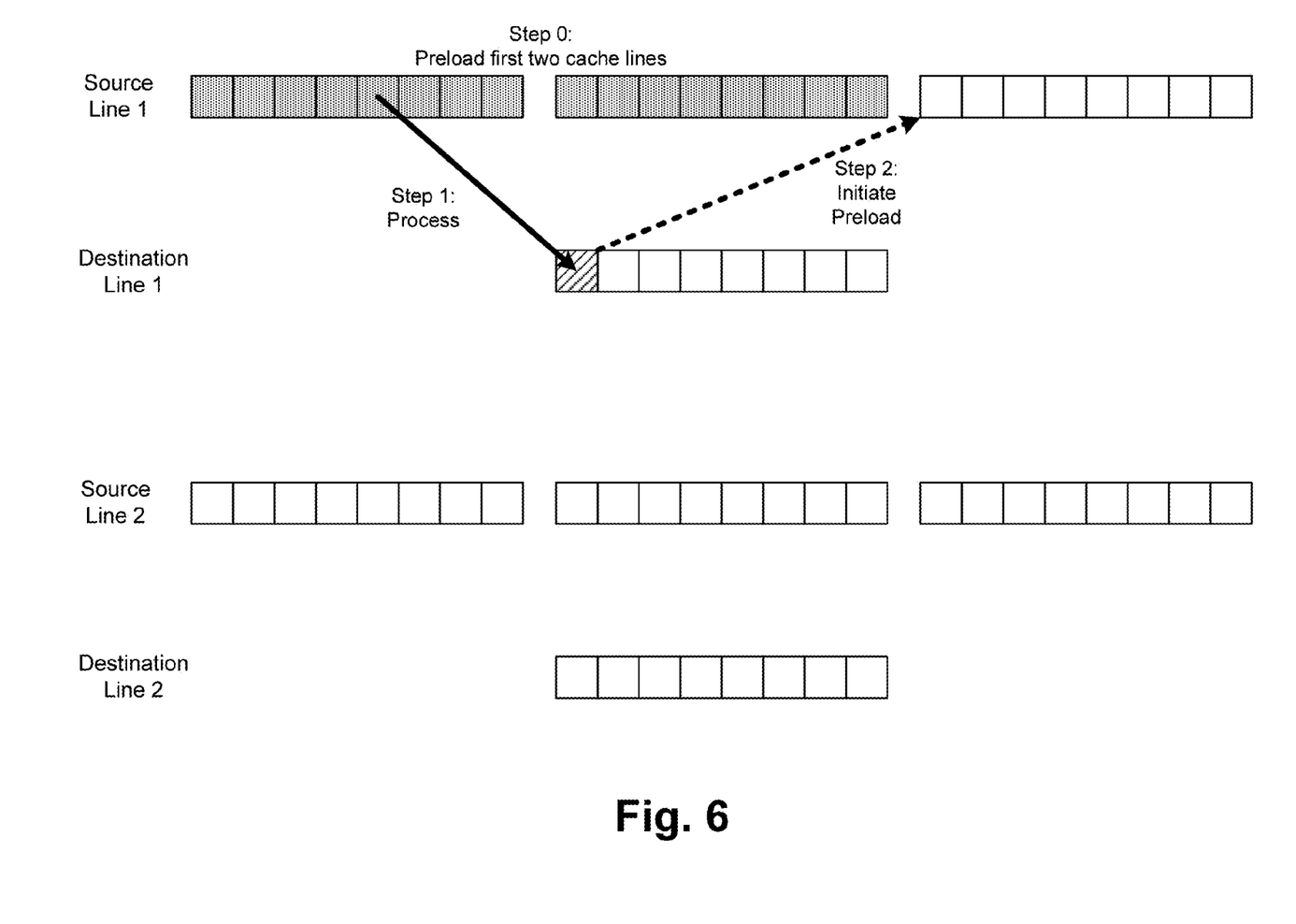
FIGS. 6-10 are block diagrams showing a time sequence example of how a graphics item may be preloaded and processed in accordance with one or more aspects described herein.

As shown in FIG. 6, the first two sets of eight pixels of Source Line 1 may be preloaded to the cache, as indicated by the shading of the first two sets of eight pixels of Source Line 1 (Step 0). This may be performed at, for example, the initial preloading of step 501. While the initial preloading is being performed, the preload table may be generated based on the properties of the graphics item being processed (e.g, the graphics line length, graphics line offset, and/or number of graphics lines in the graphics item). As previously discussed, the generation of the preload table may be performed at, for example, step 502. The remainder of the discussion of the operations with regard to FIGS. 6-10 may be performed as step 503.

In this particular example, as shown in FIG. 6, the generated preload table dictates that the first pre-cached pixel from a source line is to be copied (in this case, the first pixel is offset within Source Line 1 to be the fifth pixel of Source Line 1), and upon such copying, the next cache preload is to occur. This copying (or moving) is shown in FIG. 6 by way of the solid arrow and the diagonal striping of the first pixel of the Destination Line 1 to which the first pixel from Source Line 1 is processed. The triggering of the next cache preload is indicated by way of the broken arrow pointing from the right edge of the copied pixel in Destination Line 1 to the beginning of the next set of eight pixels (the size of a cache line). Therefore, in the present example, the preload table begins by instructing the computing device to process the first pixel (Step 1) and then to initiate a preload (Step 2) of one cache line worth of source line pixels.

Figure 7:
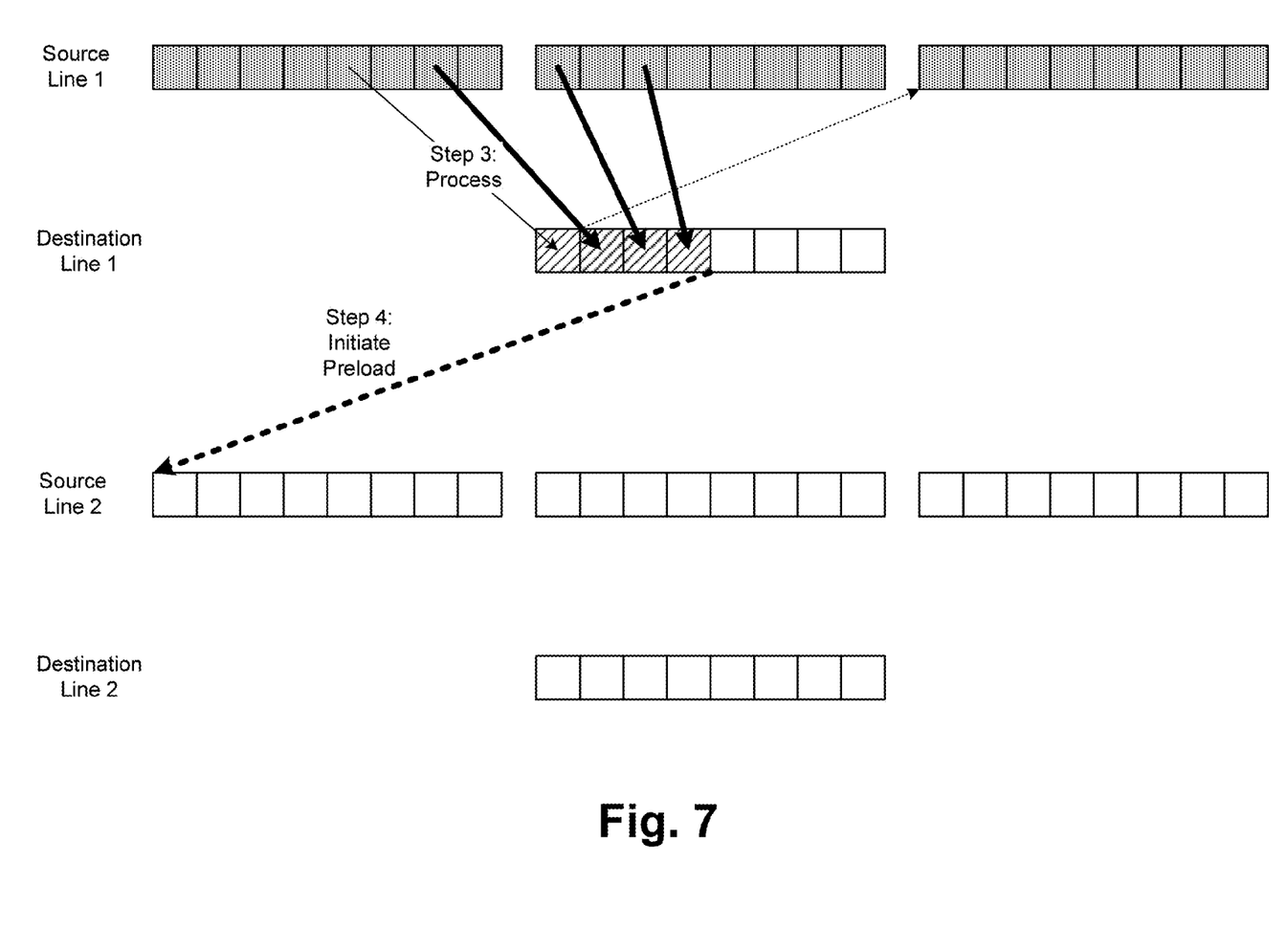

Next, as shown in FIG. 7, the preload table dictates that the next three pre-cached pixels are processed (Step 3) from the graphics line (in this case, from Source Line 1) to the destination line (in this case, Destination Line 1). According to the preload table, once these three pixels have been processed to the destination, the next set of eight pixels begin to be preloaded to the cache (Step 4). Again, such copying and preload triggering is indicated by way of solid and broken arrows and by way of shading and diagonal striping in the same manner as in FIG. 6. In this case, since Source Line 1 is already completely preloaded, preloading of Source Line 2 may be initiated so that the source data of the Source Line 2 will already be available when processing of Source Line 2 begins.

Next, as shown in FIG. 8, the next three pre-cached pixels are processed (Step 5) from Source Line 1 to Destination Line 1, according to the preload table. At the end of processing these three pixels, the preload table dictates that another preload command is issued (Step 6) for the next amount of pixels that fit within a cache line (again, in this example, the next eight pixels worth of data). Again, such processing and preload triggering is indicated by way of solid and broken arrows and by way of shading and diagonal striping in the same manner as in FIG. 6. In this example, each destination line uses only two pixels of the first cache line of its respective source line. Since preloading a cache line takes as long as processing three pixels (in this example), the second cache line could not be expected to be preloaded in time if preloading of the second cache line would not be completed at the end of the previous graphics line. This is shown by way of example in FIG. 8. Then, as shown in FIG. 9, at Step 7, the last pixel of Source Line 1 is processed without issuing a preload command. At this point, the preload table has ended for this graphics line (Source Line 1).

The preload table is re-executed now (begun again from the beginning of the preload table) for the next graphics line (Source Line 2). Thus, as shown in FIG. 9, another pre-cached pixel (this time the first pixel to be processed from Source Line 2) is processed (Step 8) to Destination Line 2, according to the preload table. At the end of processing this pixel, the preload table dictates that another preload command is issued (Step 9) for the next amount of pixels that fit within a cache line (again, in this example, the next eight pixels worth of data). Again, such processing and preload triggering is indicated by way of solid and broken arrows and by way of shading and diagonal striping in the same manner as in FIG. 6. This is similar to the situation of FIG. 6, except it is for the second cache line.

The pattern described above may be repeated as needed for each of the graphics lines. Next, as shown in FIG. 10, the remaining pre-cached pixels are processed (Step 10) from Source Line 2 to Destination Line 2. In this example, since Source Line 2 represents the final graphics line of the graphics item, no further cache preloading is performed or needed. If there were further source lines to be processed (in other words, if Source Line 2 were not the final graphics line), then the further source lines may be recursively preloaded and processed in an identical manner as Source Line 1 was preloaded and processed.

As previously discussed, the preload table may define, for a given source line, rules for when and/or how portions of the source line are to be preloaded to the cache. Where the graphics item being operated on is a rectangular item (which is a common situation, such where the graphics item is an icon), then the source lines may be expected to all be the same length as each other. Where the graphics item is not a rectangular item (e.g., has irregular boundaries), then the graphics item may be treated as a rectangular item by adding transparent (blank) pixels around the graphics item to artificially extend the boundaries of the graphics item as needed to produce rectangular boundaries. Such boundary extensions may also be performed on graphics items that are already rectangular. For instance, in either case, it may be more efficient if the length of the graphics lines is made to be a multiple of the cache line size. In this case, the rules defined by the preload table may be repeatedly used for some or all of the graphics lines of the graphics item. Because the preload table may be calculated only once for the graphics item yet used repeatedly for each of the graphics lines of the graphics items, or even for other graphics items, the ability to re-use the preload table may potentially reduce the number of calculations needed for the operation that are related to cache preloading. The ability to re-use the preload table may also obviate the need to conditional preloading commands.

While the preload table may be determined in any of a number of ways, the following is an example of an algorithm that may be used for determining the content of the preload table, shown in pseudocode. The pseudocode may generally follow some or all of the above-listed example rules (a) through (f).

```
======================
Input
nPixels:
number of pixels in destination line
nPreload:
number of pixels which can be processed during the time a preload takes
Various alignment parameters required for GetCacheLineOffset
GetCacheLineOffset:
For a given destination pixel, calculate the cache line offset, relative to
the begin of a source line, of the right most source pixel required to
calculate the given destination pixel.
GetCacheLineOffsetFirst:
Calculate the cache line offset, relative to the begin of a source line, of
the left most source pixel required to calculate the first destination pixel.
"set table empty."
set iPixelPrev = 0
set iCachePrev = GetCacheLineOffsetFirst( )
Determine "nFirst", the number of pixels, which can be processed
at the beginning of a line using only data from the first source cache line.
The value is only of interest, if it is smaller than nPreload, so we
stop searching there.
set nFirst = 0
while nFirst<nPixels and nFirst<=nPreload
do
    set iCache = GetCacheLineOffset( nFirst )
    if iCache > iCachePrev
        break
    endif
    set nFirst = nFirst+1;
enddo
If "nFirst" is less than "nPreload", the second cache line cannot
be preloaded while processing the nFirst pixels, so it must be preloaded at
the end of the previous line.
if nFirst<nPreload
then
    set iCachePrev = iCachePrev+1
endif
Go through the destination pixels.
For each destination pixel determine which source pixels are used.
If the corresponding cache line is not yet preloaded, add it to the
preload table.
for iPixel from 0 to nPixels−1
do
    iCache = GetCacheLineOffset( iPixel+nPreload )
    if iCache > iCachePrev
    then
        "Add entry to table with cache line is "iCache" and
            number of pixels is "iPixel − iPixelPrev"."
        set iPixelPrev = iPixel
        set iCachePrev = iCache
    endif
enddo
Remove cache lines which are not required from the end of the table.
set iCacheLast = GetCacheLineOffset( nPixels−1 )
while "cache line of last table entry" > iCacheLast
do
    "Subtract pixel count of last table entry from iPixelPrev"
    "Remove last table entry."
enddo
Add entries for loading the first, and possibly the second cache line to
the end of the table
"Add entry to table with cache line is "first cache line of
    next line" and number of pixels is "nPixels-iPixelPrev"."
if nFirst<nPreload
then
    "Add entry to table with cache line is "second cache line
        of next line" and number of pixels is 0."
endif
Add a termination entry at the end of the list.
After processing the number of pixels in the termination entry, the
line ends.
"Add entry to table with cache line is "terminate" and number
    of pixels is 0."
All entries should have at least nPreload pixels to process.
But the first and last entry are special.
Before the first entry, there is no preload, so the first entry can have 0
pixels. Also after the last entry no preload is done. If nFirst<nPreload
is true, the last entry preloads the second cache line of the new line. In
this case the data preload by the second last entry need not be available
before the second cache line is required.
In order to simplify the algorithm, excess pixels are added to the first
and last entry and subtracted later, so that all entries can be brought
to nPreload pixels.
"Add nPreload pixels to pixel count of first entry."
if nFirst<nPreload
then
    "Add nFirst pixels to pixel count of last entry."
endif
Distribute pixels so that if possible all entries have at least nPreload pixels.
set iPlus = last entry of table
while iPlus is not the first entry of the table
do
    if "number of pixels of table entry iPlus" < nPreload
    then
        set iMinus to "previous entry of iPlus"
        while iMinus>="first entry of table"
        do
            if "number of pixels of table entry iMinus" >
                nPreload
            then
                "Shift Minimum(
                    "numer of pixels of iMinus" − nPreload,
                    nPreload − "numer of pixels of iPlus")
                    pixels from table entry "iMinus" to "iPlus"."
                if number of pixels of "iPlus" = nPreload
                then
                    break while loop
                endif
            endif
            Set iMinus to "previous entry of iMinus"
        enddo
    endif
    set iPlus to "previous entry of iPlus"
enddo
Subtract the excess pixels added above from the first and last entry
"Subtract nPreload pixels from pixel count of first entry."
if nFirst<nPreload
then
    "Subtract nFirst pixels from pixel count of last entry."
endif
======================
```

Of course, many other ways to generate and/or execute the preload table may be performed, depending upon the rule set used and the complexity desired.

Figure 11A:
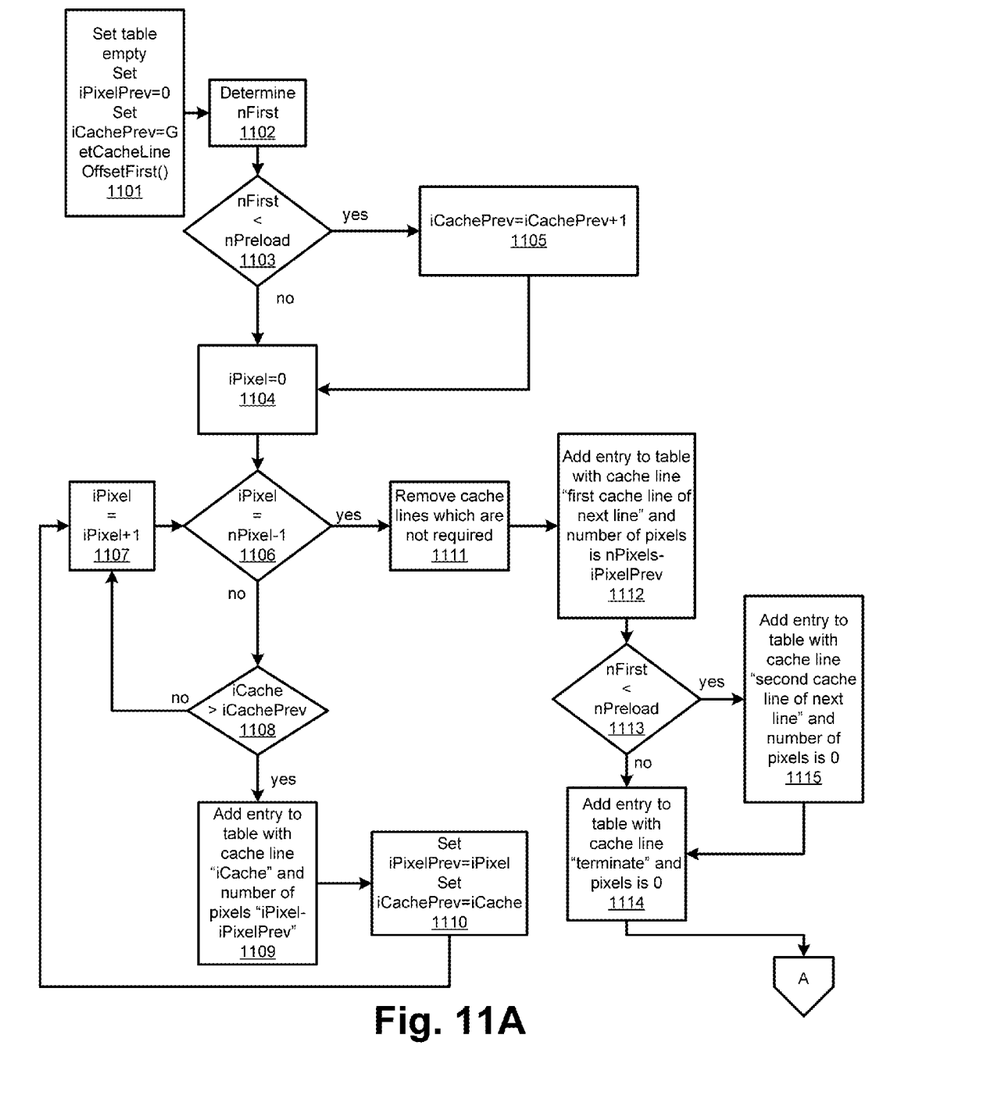
FIGS. 11A-11C are flow charts showing example steps that may be performed in accordance with one or more aspects described herein.
Figure 11B:
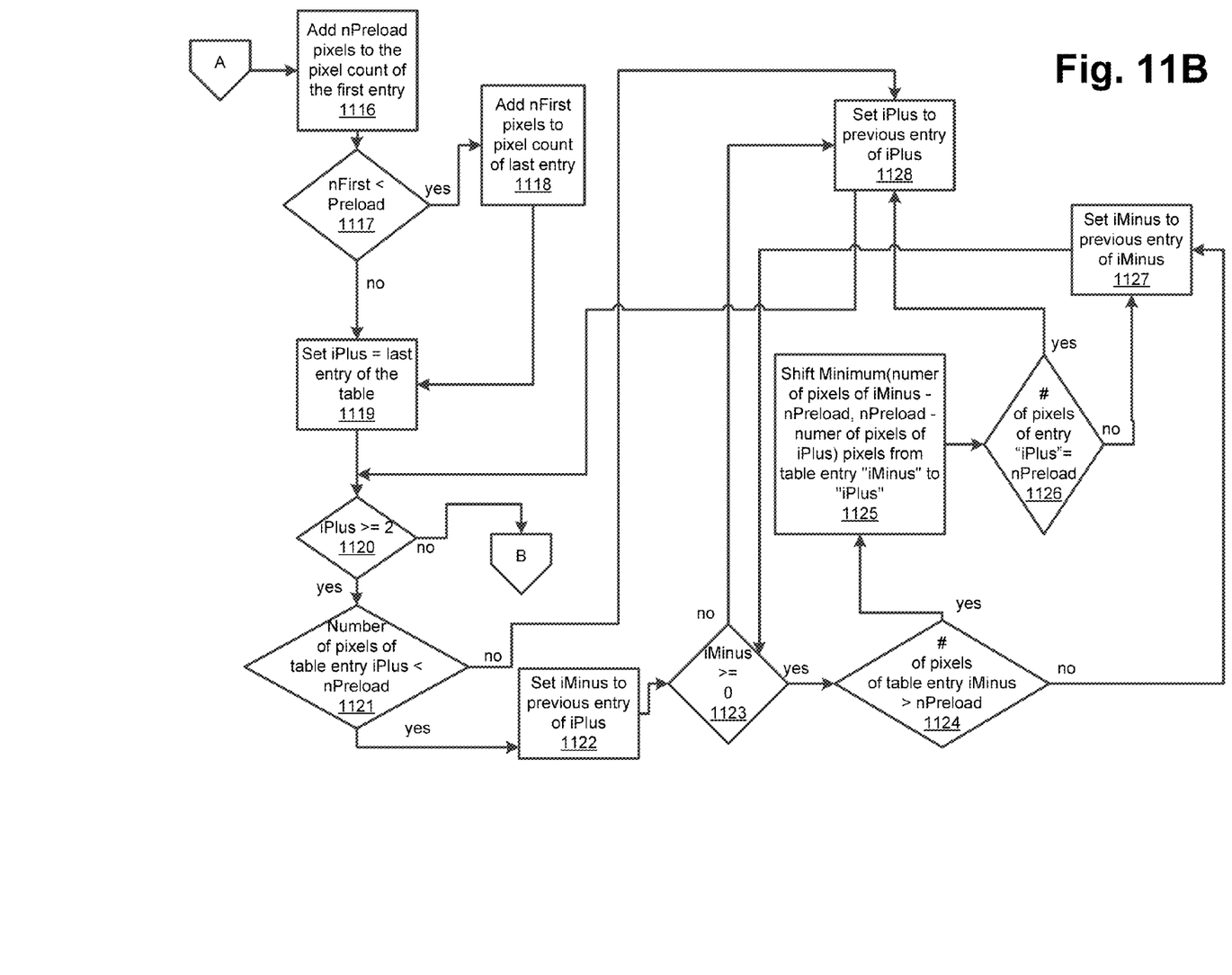
Figure 11C:
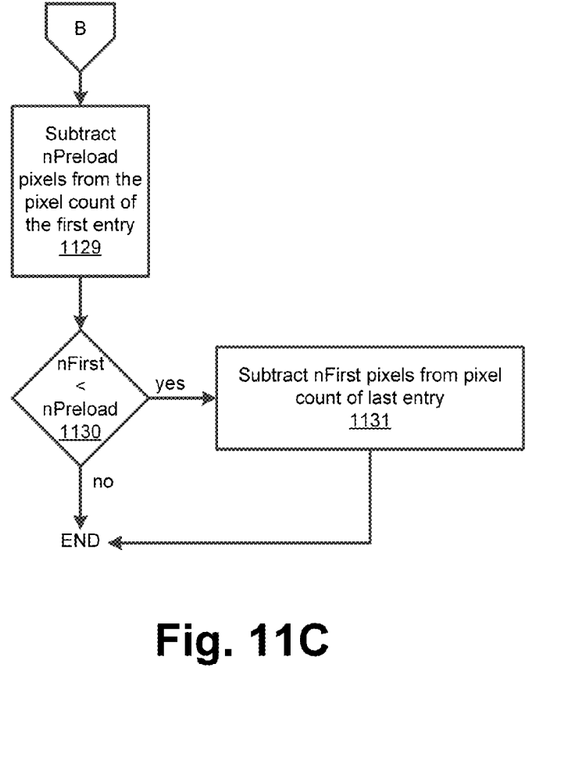

FIGS. 11A-11C are flow charts showing example steps that may be performed in accordance with one or more aspects described herein, as another example of how to generate a preload table. The steps generally follow the above pseudocode. The particular values and names used herein are only examples, and are not intended to be limiting. The process of FIGS. 11A-11C may be performed by the computing device, such as by the processor 101.

Beginning with the example of FIG. 11A, at step 1101, the preload table is set to empty, the value of iPixelPrev is set to zero, and the value of iCachePrev is set to GetCacheLine OffsetFirst( ). GetCacheLineOffsetFirst is a function, which might take various implementation dependant parameters, like the number of bytes per pixel and the start offset of the source line, and determines the cache line offset of the first pixel used from the source line. Cache line offset is here the offset of the cache line relative to the start of a graphical line containing the source in units of cachelines (not pixels). At step 1102, the value of nFirst is determined, where nFirst is the number of pixels which can be processed at the beginning of a line using only data from the first source cache line. At step 1103 it is determined whether the value of nFirst is less than the value of nPreload (for instance, the value n as previously described above). If not, then the process moves directly to step 1104 where the value iPixel is set to zero, which indicates the beginning of a line. If so, the second cache line cannot be preloaded while processing the nFirst pixels, so it must be preloaded at the end of the previous line. In this case the process moves to step 1105 where the value of iCachePrev is set to iCachePrev+1 to indicate that two cache lines are already preloaded when a line starts. Then the process moves to step 1104.

Next, at step 1106, it is determined whether iPixel is the index of the last pixel of a line by comparing the value of iPixel with that of nPixel−1, where nPixel is the number of pixels in the destination line. If not, then the process moves to step 1108, where it is determined whether the current pixel iPixel requires a new cache line by testing whether the value of iCache is greater than the value of iCachePrev. If at step 1108 it is determined that the value of iCache is not greater than the value of iCachePrev, then the process moves to step 1107. At step 1107, the current pixel is advanced to the next pixel in the destination line by setting the value of iPixel to the value of iPixel+1. After step 1107, the process moves back to step 1106. If at step 1108 it is determined that the value of iCache is greater than the value of iCachePrev, then the process moves to step 1109. At step 1109, an entry is added to the preload table with a cache line value of iCache and a number of pixels of iPixel-iPixelPrev. Next, at step 1110, the value of iPixelPrev is set to iPixel and the value of iCachePrev is set to iCache. The process then moves back to step 1107. If at step 1106 it is determined that the value of iPixel is the same as that of nPixel−1, the process moves to step 1111. In other words, the process moves through each destination pixel and determines for each destination pixel which source pixels are used. If the corresponding cache line is not yet preloaded, then that cache line is added to the preload table.

At step 1111, the cache lines which are not required, that is cache lines which contain data beyond the end of the source line, are removed from the end of the table. Next at step 1112 to the table an entry is added with a cache line value of "first cache line of next line" and a number of pixels of "nPixels–iPixelPrev". The process then moves to step 1113. At step 1113, it is determined if two cache lines are preloaded at the beginning of a line by testing if the value of nFirst is less than the value of nPreload. If not, then the process moves directly to step 1114 where an entry is added to the table with a cache line value of "terminate" and a pixel count of zero. If so, then the process moves to step 1115 where an entry is added to the table with a cache line value of "second cache line of next line" and a pixel count of zero. The process then moves to step 1114 and continues to step 1116.

All entries should have at least nPreload pixels to process, except for first and last entry. Before the first entry, there is no preload, so the first entry can have 0 pixels. Also after the last entry no preload is done. If nFirst<nPreload is true, the last entry preloads the second cache line of the new line. In this case the data preload by the second last entry need not be available before the second cache line is required. In order to simplify the algorithm, excess pixels are added to the first and last entry and subtracted later, so that all entries can be brought to nPreload pixels. This is shown in FIG. 11B, starting with step 1116, where nPreload pixels are added to the pixel count of the first entry. Next, at step 1117, it is determined if the value of nFirst is less than the value of Preload. If not, then the process moves directly to step 1119. If so, then the process moves to step 1118. At 1118 nFirst pixels are added to the pixel count of the last entry of the table, and then the process moves to step 1119. At step 1119 starts the process of distributing the pixel counts among the table entries such that, if possible, all table entries have a pixel count of nPreload or more. This is done by finding entries iPlus, which don't have enough pixels and an entries iMinus, which has excess pixels and by moving pixels from table entry iMinus to table entry iPlus. First the value of iPlus is set to the last entry of the table. Next, at step 1120, it is determined if iPlus is the first entry of the table. If so, then the process moves directly to step 1129 (FIG. 11C). If not, then the process moves to step 1121. At step 1121, it is determined if the number of pixels of the table entry iPlus is less than the value of nPreload. If not, the table entry iPlus already has sufficient pixels and the process moves to step 1128. If so, the process moves to step 1122. At step 1122, the value of iMinus is set to the previous entry of iPlus, and the process moves to step 1123.

At step 1123, it is determined if the value of iMinus is greater than or equal to 0, that is if iMinus did not move beyond the begin of the table. If not, no more pixels can be added to entry iPlus and the process moves to step 1128. If so, then the process moves to step 1124. At step 1124, it is determined if the number of pixels of the table entry iMinus is greater than the value of nPreload. If so, the process moves to step 1125. At step 1125, the minimum of the number of pixels of iMinus minus the value of nPreload and the value of nPreload minus the number of pixels of iPlus is determined, and that number of pixels is shifted from the table entry of iMinus to the table entry of iPlus. The process then moves to step 1126 where it is determined if the number of pixels of the table entry iPlus is equal to the value of nPreload. If not, then the process moves to step 1127 to search for another entry iMinus. If so, then entry iPlus has received sufficient pixels and the process moves to step 1128. If at step 1124, it is determined that the number of pixels of the table entry of value iMinus is not greater than the value of nPreload, the process moves to step 1127. At step 1127, the value of iMinus is set to the previous entry of iMinus. The process then moves back to step 1123. If at step 1123 it is determined that the value of iMinus is not greater than or equal to 0, the process moves to step 1128. At step 1128 the value if iPlus is set to the previous entry of iPlus. The process then moves back to step 1120.

At step 1129 (FIG. 11C) and following, the excess pixels added in step 1116 and 1118 above are subtracted. At step 1129 nPreload pixels are subtracted from the pixel count of the first entry. The process then moves to step 1130. At step 1130, it is determined if the value of nFirst is less than the value of nPreload. If not, the process ends. If so, the process moves to step 1131. At step 1131, nFirst pixels are subtracted from the pixel count of the last entry. Then the process ends.

In view of the disclosure herein, non-limiting examples of aspects that may be claimed include at least the following:

(1) A method, comprising: determining, by a computing device, a preload table based on a graphics item, wherein the graphics item comprises a plurality of graphics lines, and wherein the preload table indicates a pattern of pixel processing and cache line preloading operations for a single one of the graphics lines; and for each of the graphics lines, processing the pixels and performing the cache line preloading operations according to the preload table, by the computing device. Said processing the pixels may comprise processing as part of at least one of the following: an alpha blending operation, an interpolation operation, a color format conversion operation, or a color processing operation. The preload table may comprise pairs of values, wherein each pair of values indicates a number of pixels to be processed and an index of a cache line to be preloaded. Said determining may comprise determining the preload table based on an offset of a first pixel of each graphics line of the graphics item. Said determining may comprise determining the preload table based on a length of each graphics line of the graphics item. Said determining may comprise determining the preload table based on a scaling factor between a source and a destination graphics item. The length of each graphics line may be the same. Said determining may comprise determining the preload table such that the preload table identifies instructions that each of a plurality of cache lines are preloaded according to the preload table are preloaded at least a predetermined number of pixels before a pixel from the cache line is processed according to the preload table. Said determining may comprise determining the preload table such that the preload table identifies instructions that a first cache line used for a next one of the graphics lines is preloaded upon preloading a last cache line for a current one of the graphics lines. Said determining may comprise determining the preload table such that the preload table identifies further instructions that if the first cache line holds less than a predetermined number of pixels, then a second next cache line is also preloaded.

(2) A computer-readable storage medium storing computer-executable instructions for performing a method, the method comprising: determining, by a computing device, a preload table based on a graphics item, wherein the graphics item comprises a plurality of graphics lines, and wherein the preload table indicates a pattern of pixel processing and cache line preloading operations for a single one of the graphics lines; and for each of the graphics lines, processing the pixels and performing the cache line preloading operations according to the preload table, by the computing device. Said processing the pixels may comprise processing as part of at least one of the following: an alpha blending operation, an interpolation operation, a color format conversion operation, or a color processing operation. The preload table may comprise pairs of values, wherein each pair of values indicates a number of pixels to be processed and an index of a cache line to be preloaded. Said determining may comprise determining the preload table based on an offset of a first pixel of each graphics line of the graphics item. Said determining may comprise determining the preload table based on a length of each graphics line of the graphics item. Said determining may comprise determining the preload table based on a scaling factor between a source and a destination graphics item. Said determining may comprise determining the preload table such that the preload table identifies instructions that each of a plurality of cache lines are preloaded according to the preload table are preloaded at least a predetermined number of pixels before a pixel from the cache line is processed according to the preload table. Said determining may comprise determining the preload table such that the preload table identifies instructions that a first cache line used for a next one of the graphics lines is preloaded upon preloading a last cache line for a current one of the graphics lines. Said determining may comprise determining the preload table such that the preload table identifies further instructions that if the first cache line holds less than a predetermined number of pixels, then a second next cache line is also preloaded.

(3) A method, comprising: determining, by a computing device, a preload table based on a graphics item, wherein the preload table indicates how many pixels to process before performing a cache line preloading operation; and for each of a plurality of graphics lines of the graphics item, re-using by the computing device the preload table to process pixels of the graphics line and perform cache preloading. Said processing the pixels may comprise processing as part of at least one of the following: an alpha blending operation, an interpolation operation, a color format conversion operation, or a color processing operation. Said re-using the preload table may comprise using, for each of the graphics line, the preload table as a set of instructions, and performing pixel processing and cache preloading according to the instructions.

Aspects of the disclosure have been described in terms of illustrative embodiments thereof. While illustrative systems and methods as described herein embodying various aspects of the present disclosure are shown, it will be understood by those skilled in the art that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples, and any of the above described systems, methods, or parts thereof may be combined with the other systems, method, or parts thereof described above.

In one or more arrangements, any and/or all of the steps of the example methods described herein may be performed by a computing device (e.g., computing device 100), performed by a plurality of computing devices operating as a computing system (e.g., a network), and/or embodied as computer-executable instructions stored on one or more non-transitory and/or tangible computer-readable storage media (e.g., a hard disk, an optical disk, a removable disk, memory, etc.). Furthermore, one of ordinary skill in the art will appreciate that the steps illustrated in the illustrative figures may be performed in other than the shown order, and that one or more of the steps may be optional in accordance with aspects of the disclosure. It will also be appreciated and understood that modifications may be made without departing from the true spirit and scope of the present disclosure. The description is thus to be regarded as illustrative, rather than restrictive.

The invention claimed is:

1. A method for processing a graphics item comprising a plurality of graphics lines, each graphics line comprising one or more pixels, the method comprising:
   loading, by a computing device, a first cache line with a first set of pixels from a first graphics line of the graphics item,
   while loading the first cache line, generating, by the computing device, a preload table based on the properties of the first graphics line, and wherein the preload table indicates a pattern of pixel processing and cache line preloading operations for a single graphic line of the plurality of graphics lines, wherein the pattern of pixel processing comprises rendering one or more destination pixels;
   processing at least one pixel of first cache line and simultaneously preloading a next cache line with a next set of pixels until all but a last pixel of the first graphics line is processed;
   processing the last pixel of the first graphics line without issuing a preload command; and
   repeating the method for each graphic line in this manner until all graphic lines of the graphic item are processed.

2. The method of claim 1, wherein said processing the pixels comprises processing as part of at least one of the following: an alpha blending operation, an interpolation operation, a color format conversion operation, or a color processing operation.

3. The method of claim 1, wherein the preload table comprises pairs of values, wherein each pair of values indicates one or more particular pixels of the graphics line to be processed and an index or index offset of a cache line to be preloaded.

4. The method of claim 1, wherein said determining comprises determining the preload table based on an offset of a first pixel of each graphics line of the graphics item.

5. The method of claim 1, wherein said determining comprises determining the preload table based on a length of each graphics line of the graphics item.

6. The method of claim 4, wherein the length of each graphics line is the same.

7. The method of claim 1, wherein said determining comprises determining the preload table such that the preload table identifies instructions that each of a plurality of cache lines are preloaded according to the preload table are preloaded with at least a predetermined number of pixels before a pixel from the cache line is processed according to the preload table.

8. The method of claim 1, wherein said determining comprises determining the preload table such that the preload table identifies instructions that a first cache line used for a next one of the graphics lines is preloaded upon preloading a last cache line for a current one of the graphics lines.

9. The method of claim 8, wherein said determining comprises determining the preload table such that the preload table identifies further instructions that if the first cache line holds less than a predetermined number of pixels, then a second next cache line is also preloaded.

10. A non-transitory computer-readable storage medium comprising computer-executable instructions when executed by a computing device for performing a method for processing a graphics item comprising a plurality of graphics lines, each of the graphics line comprising one or more pixels, the method comprising:
   loading, by a computing device, a first cache line with a first set of pixels from a first graphics line of the graphics item;
   while loading the first cache line, determining, by the computing device, a preload table based on the properties of the first graphics line, wherein the preload table indicates a pattern of pixel processing and cache line preloading operations for a single graphic line of the plurality of graphics lines, wherein the pattern of pixel processing comprises rendering one or more destination pixels;
   processing at least one pixel of the first cache line and simultaneously preloading a next cache line with a next set of pixels until all but a last pixel of the first graphics line is processed;
   processing the last pixel of the first graphics line without issuing a preload command; and
   repeating the method for each graphic line in this manner until all graphic lines of the graphic item are processed.

11. The non-transitory computer-readable storage medium of claim 10, wherein said processing the pixels comprises processing as part of at least one of the following: an alpha blending operation, an interpolation operation, a color format conversion operation, or a color processing operation.

12. The non-transitory computer-readable storage medium of claim 10, wherein the preload table comprises pairs of values, wherein each pair of values indicates one or more of particular pixels of the graphics line to be processed and an index or index offset of a cache line to be preloaded.

13. The non-transitory computer-readable storage medium of claim 10, wherein said determining comprises determining the preload table based on an offset of a first pixel of each graphics line of the graphics item.

14. The non-transitory computer-readable storage medium of claim 10, wherein said determining comprises determining the preload table based on a length of each graphics line of the graphics item.

15. The non-transitory computer-readable storage medium of claim 10, wherein said determining comprises determining the preload table such that the preload table identifies instructions that each of a plurality of cache lines are preloaded according to the preload table are preloaded at least a predetermined number of pixels before a pixel from the cache line is processed according to the preload table.

16. The non-transitory computer-readable storage medium of claim 10, wherein said determining comprises determining the preload table such that the preload table identifies instructions that a first cache line used for a next one of the graphics lines is preloaded upon preloading a last cache line for a current one of the graphics lines.

17. The non-transitory computer-readable storage medium of claim 16, wherein said determining comprises determining the preload table such that the preload table identifies further instructions that if the first cache line holds less than a predetermined number of pixels, then a second next cache line is also preloaded.

18. A method for processing a graphics item comprising a plurality of graphics lines, each graphics line comprising one or more pixels, the method comprising:
   loading, by a computing device, a first cache line with at least a first part of a first graphics line of the graphics item,
   generating, by the computing device, a preload table based on the graphics item, wherein the preload table indicates how many pixels to process before performing a cache line preloading operation and indicates one or more destination pixels to render;
   for each of a plurality of graphics lines of the graphics item, re-using by the computing device the preload table by applying the pre-load table line-by-line to each graphic line of the plurality of graphic lines to process pixels of the graphics line and perform cache preloading; and
   wherein the preload table is generated based on at least one or more factors selected from the group consisting of a length of a graphics line, an alignment of a graphics lines, a length of a cache line, a scaling factor, a preload distance, and combinations thereof.

19. The method of claim 18, wherein said processing the pixels comprises processing as part of at least one of the following: an alpha blending operation, an interpolation operation, a color format conversion operation, or a color processing operation.

20. The method of claim 18, wherein said re-using the preload table comprises using, for each of the graphics line, the preload table as a set of instructions, and performing pixel processing and cache preloading according to the instructions.

* * * * *